Nov. 5, 1929.  C. E. FARRINGTON  1,734,120
STIRRING DEVICE
Filed June 24, 1926
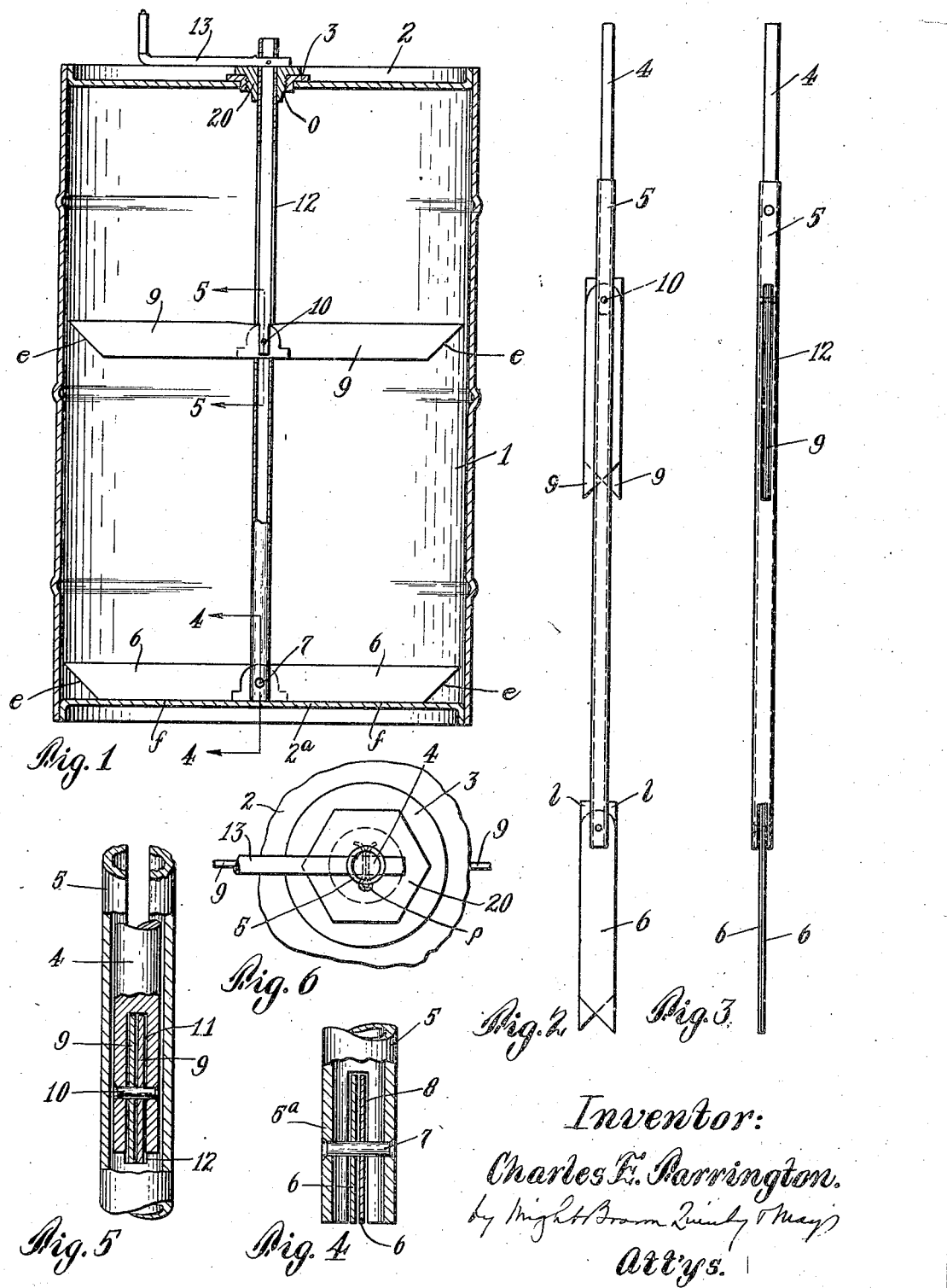
Inventor:
Charles E. Farrington.
by Wright Brown Quinby & May
Atty's.

Patented Nov. 5, 1929

1,734,120

UNITED STATES PATENT OFFICE

CHARLES E. FARRINGTON, OF PHOENIXVILLE, PENNSYLVANIA

STIRRING DEVICE

Application filed June 24, 1926. Serial No. 118,202.

This invention has relation to a stirring or agitating device, and has for one of its objects to provide a portable and collapsible device especially intended for ready assembly and disassembly with steel drums, wooden barrels, or like containers for liquid materials, without necessitating the removal of the top of the container. Another object is to provide a device which effectively scrapes any material which has settled on the bottom of the container.

Briefly stated, the novel device comprises stirring blades, which are pivotally secured at their inner ends to the lower end of a stirrer shaft. The blades fall into vertical or closed position when the device is held vertically suspended, but when lowered and rested on a support, as on the bottom of a container, the blades are horizontally extended or opened to contact and rest on the bottom along the entire length of their lower edges, so that upon rotation of the shaft, material which has settled on the bottom is scraped therefrom. The device, therefore, is particularly applicable for stirring suspensions or mixtures such as light weight enamels or paints, oil mixtures, inks, insecticides, and like liquid materials which do not settle hard or cake. The device further comprises auxiliary upper blades pivotally supported at their inner ends on a rod slidably fitted within the stirrer shaft, which is hollow. The shaft is slotted at opposite sides thereof and designed to permit the auxiliary blades to be closed or collapsed to a vertical position within the slots, so that the device as a whole may be passed through a suitable opening formed through the top of a container.

The invention will be more fully hereinafter described in conjunction with the accompanying drawings, in which Figure 1 represents a section through a container of the steel drum type, with which the stirring device of the present invention is shown assembled.

Figures 2 and 3 are side and end views, respectively, of the device with all the blades in closed or collapsed position, ready for assembly with the container.

Figure 4 is a detail section on the line 4—4 of Figure 1, and shows the construction by which the lower blades are supported on the stirrer shaft.

Figure 5 is a similar section on the line 5—5 of Figure 1, and shows the manner of supporting the upper auxiliary blades.

Figure 6 is a fragmentary plan view of the assembly of Figure 1 showing means for rotating the stirrer shaft at its upper end.

On the accompanying drawings, in Figure 1 the device is shown assembled, ready for use with a closed container of the steel drum type, indicated as a whole at 1. The top 2 of the container is centrally provided with an opening O, through which the device as a whole may be passed when the blades are in collapsed or closed position, as shown in Figures 2 and 3, and lowered into position. The drum is shown provided with a flanged collar 3 internally threaded for the reception of a screw plug to close the container while in transit or in storage, and which is fastened in the top extending through the opening O, as by welding.

The device comprises a hollow stirrer shaft 5 of tubular or pipe form, on which are pivotally supported at its lower end the inner ends of a pair of blades 6. As shown, slots 8 are cut through opposite sides at the lower end of the shaft for the reception of the inner ends of the blades which are pivotally supported on a pin or rivet 7 passed therethrough and held in the opposite lower portions 5ª of the shaft defined by the slots 8. When the device is held vertically suspended, the blades fall by their own weight into a vertical or closed position, in lapping relation. The blades are horizontally extended or opened to horizontal position when the device is lowered and rested on a support.

Opposite inner corners of each of the blades are shown as being rounded off to facilitate their pivotal movement as they ride out over the bottom of the container to horizontal position. Preferably, the other opposite inner corners of each of the blades are provided with a stop or lug l, which projects upwardly beyond the slot 8 when the blades are closed and prevents both the blades from being opened or extended in the same direction, by striking exteriorly against the shaft 5. Preferably, also, the outer ends of the blades are eccentrically pointed, so that when the device is rested on a support, it is unstably supported and the blades tend to ride out to their horizontally extended or opened position, as shown, the outer portion e of the lower edge of each of the blades being inclined upwardly toward the upper edge, so that the blades tend to extend in opposite directions when the device is being lowered.

Within the tubular shaft 5 is slidably fitted a solid, uniformly cylindrical rod 4, which has a slot 11 at its lower end for the reception of the inner ends of a pair of auxiliary blades 9, similar to the blades 5. These blades are pivotally supported at their inner ends on a pin 10 held in place by the portions 5ª on opposite sides of the slot 11. The blades 9 pass through elongated slots 12 formed through opposite sides of the tubular shaft and of sufficient length to permit the blades to be closed or collapsed thereinto. The blades 9 are normally only slightly opened and may be fully opened or extended horizontally by pushing the rod 4 into the shaft. Upon lifting the rod 4, the blades fall or collapse in vertical or closed position in lapping relation within the slots 12. Preferably, the lower ends of the slots 12 are located substantially centrally of the shaft 5, so that when the blades are opened, they are supported substantially centrally thereof by the wall of the shaft at the lower ends of the slots. The width of the blades is greater than the diameter of the shaft 5, so that there is no possibility of the blades accidentally falling or being worked out of place within the shaft. Preferably, the outer portions e of the lower edge of each of the blades 9 are inclined toward their upper edges and are otherwise constructed similarly to the blades 6, thereby affording a standard blade construction for the entire device. The inclined edges e also tend to wedge and maintain the blades slightly open at all times, and also to preclude the blades from becoming stuck in collapsed condition.

It will thus be seen that upon inserting the device with its blades in collapsed position, as shown in Figures 2 and 3, through the opening O into the drum, and lowering it, the blades 6 strike the bottom 2ª of the drum, and are opened or extended to contact along the entire length of their lower edges f with the bottom substantially across its full diameter. The weight of the entire device bears against the bottom and thus assures a good scraping action by the blades. After the device has been lowered into position, an annular screw member 20, which serves as a bearing, is passed over the shaft 5 and screwed into the collar 3. The rod 4 may then be pushed into the shaft 5 to open the blades 9 fully, and may be held or locked in position by passing a handle 13 through an aperture formed through the upper end of the shaft. The handle may be fixed in position as by a cotter pin p passing through the shaft and handle. The contents of the drum may now be stirred by turning the handle. Since the device is entirely closed, loss of any liquid material by splashing or vaporization is prevented.

The device may be disasembled from the drum 1, by disengaging the handle 13 and unscrewing the annular member 20. The weight of the pivoted blades 9 causes them to collapse to their normally slightly open position and to push or force the rod 4 through the upper end of the hollow shaft 5, so that the rod may be grasped and the entire device lifted and removed from the container. The usual screw plug may then be screwed into the collar 3 to close the drum.

Having thus described an embodiment of this invention, it is evident that various changes or modifications might suggest themselves without departing from its spirit or scope as defined by the appended claims.

What I claim is:

1. A collapsible stirring device comprising a vertical shaft slotted at its lower end to form two portions, a pin extending from one portion to another, and a pair of blades pivotally supported on said pin at their inner ends, the opposite inner corners of each of the blades having a stop projecting upwardly beyond the slot to prevent the blades from being extended in the same direction, said blades falling vertically in lapping relation with one another when said shaft is suspended and being horizontally extended in opposite directions when said device is lowered on to a support so as to contact with the support along the entire length of their lower edges.

2. A stirring device comprising a vertical, tubular shaft, a solid, uniformly cylindrical rod slidably fitted within said shaft, and a pair of blades pivotally secured to said rod and rotatable by said shaft.

3. A collapsible stirring device comprising a vertical, tubular shaft, a rod fitted within said shaft, and a pair of blades pivotally secured to the lower end of said rod, said shaft having vertical slots cut through opposite sides thereof and whose lower ends terminate substantially centrally thereof to permit said blades to be closed vertically in lapping relation and to be extended horizontally.

4. A collapsible stirring device comprising a vertical, tubular shaft, a rod fitted within said shaft, and a pair of blades pivotally secured to the lower end of said rod, the outer portions of the lower edges of said blades being inclined toward their upper edges and said shaft having slots cut through opposite sides thereof and whose lower ends terminate substantially centrally thereof, to permit said blades to be closed vertically in lapping relation and to be extended or opened horizontally.

5. A stirring device comprising a vertical, hollow shaft, blades pivotally secured at their inner ends to the lower end of the shaft, a rod fitted within said shaft, and blades pivotally secured at their inner ends to said rod.

6. A collapsible stirring device, comprising a vertical, tubular shaft slotted at its lower end to form two portions, a pin extending from one portion to another, and a pair of blades pivotally supported on said pin at their inner ends, said blades falling vertically in lapping relation with one another when said shaft is suspended and being horizontally extended in opposite directions when said device is lowered on to a support so as to contact with the support along the entire length of their lower edges.

7. A collapsible stirring device, comprising a hollow, vertical shaft slotted at its lower end to form two portions, a pin extending from one portion to the other, a pair of blades pivotally supported on said pin at their inner ends, a rod slidably fitted within said shaft and slotted at its lower end to form two portions, a pin extending from one portion to the other, and a pair of blades pivotally supported on said pin at their inner ends, said shaft having slots cut through opposite sides thereof intermediate its ends to permit said blades to be closed vertically in lapping relation and to be extended or opened horizontally.

8. In combination with a container having a top provided with a central opening, of a stirring device comprising a vertical shaft and a pair of blades pivotally secured to the lower end of said shaft, said blades falling vertically in lapping relation with one another when said device is suspended to permit the device to be inserted through said opening into said container and being horizontally extended when said device is lowered onto the bottom of the container so as to scrape said container when the shaft is rotated.

9. In combination with a container having a top provided with a central opening, of a stirring device comprising a vertical, hollow shaft extending through said opening, an annular bearing member in said opening through which said shaft passes, means for rotating said shaft, a pair of blades pivotally secured to the lower end of said shaft, said blades falling vertically closed in lapping relation with one another when said device is suspended and being horizontally extended when said device is lowered onto the bottom of the container, a rod slidably fitted within said shaft and slotted at its lower end to form two portions, a pin extending from one portion to another, a pair of blades pivotally supported on said pin at their inner ends, said shaft having slots cut through opposite sides thereof to permit said blades to be vertically closed, and means for holding said last mentioned pair of blades extended, said device being insertable through said opening into said container when all said blades are vertically closed.

10. In combination with a container having a top provided with a central opening of a stirring device comprising a vertical, hollow shaft extending through said opening, a pair of lower blades pivotally secured to the lower end of said shaft, said blades falling vertically closed in lapping relation with one another when said device is suspended and being horizontally extended when said device is lowered onto the bottom of the container, a rod slidably fitted within said shaft and slotted at its lower end to form two portions, a pin extending from one portion to another, a pair of upper blades pivotally supported on said pin at their inner ends, said shaft having slots cut through opposite sides thereof to permit said blades to be vertically closed, the upper end of said rod normally extending above the upper end of said shaft and said upper blades being normally only slightly open, and means for locking said upper blades in horizontally extended or open position, said device being insertable through said opening into said container when all said blades are vertically closed.

11. In combination with a container having a top provided with a central opening of a stirring device comprising a vertical hollow shaft extending through said opening, a pair of lower blades pivotally secured to the lower end of said shaft, said blades falling vertically closed in lapping relation with one another when said device is suspended, a rod slidably fitted within said shaft and slotted at its lower end to form two portions, a pin extending from one portion to another, a pair of upper blades pivotally supported on said pin at their inner ends, said shaft having slots cut through opposite sides thereof to permit said blades to be vertically closed, the upper end of said rod normally extending above the upper end of said shaft and said upper blades being normally only slightly open, and a handle for rotating said shaft passing through the upper end of said shaft and holding the rod in position within said shaft with said upper blades horizontally extended, said device being insertable through said opening in said container when all said blades are vertically closed.

12. In combination with a drum or like container for liquids from which material tends to settle, of a stirring device comprising a hollow shaft, a pair of blades pivotally secured to the lower end of the shaft and contacting with the bottom of the container substantially across its full diameter, a rod fitted within said shaft, and a pair of blades pivotally secured to the lower end of said rod, said shaft having vertical slots cut through opposite sides thereof to permit said last-mentioned blades to be closed vertically in lapping relation and to be extended horizontally.

In testimony whereof I have affixed my signature.

CHARLES E. FARRINGTON.